Oct. 16, 1951  M. R. McKINLEY  2,571,916
PIPE LINE DEVICE

Filed April 9, 1946  4 Sheets-Sheet 1

INVENTOR
Major R. McKinley
By Green, McCallister and Miller
His attorneys Oct. 16, 1951  M. R. McKINLEY  2,571,916
PIPE LINE DEVICE Filed April 9, 1946  4 Sheets-Sheet 3

INVENTOR
Major R. McKinley
By Green, McCallister and Miller
His attorneys

Oct. 16, 1951  M. R. McKINLEY  2,571,916
PIPE LINE DEVICE

Filed April 9, 1946  4 Sheets-Sheet 4

INVENTOR
Major R. McKinley
By Green, McCallister and Miller
His attorneys

Patented Oct. 16, 1951

2,571,916

UNITED STATES PATENT OFFICE 2,571,916

PIPE-LINE DEVICE

Major R. McKinley, Monongahela, Pa.

Application April 9, 1946, Serial No. 660,795

13 Claims. (Cl. 137—73)

This invention pertains to an arrangement for cutting out a section of a pipe line carrying a fluid such as a gas or liquid supply, and particularly, to improved apparatus for cutting out a portion of a pipe line and for closing off the cut out portion. Previous to the present invention, apparatus for accomplishing the above result has been rather complicated, expensive and involved in operation and application.

It has thus been an object of my invention to provide an improved arrangement for shunting fluid flow around one section of a pipe length carrying a fluid under suitable pressure, such as gas, oil, water, etc.

Another object has been to provide improved apparatus that can be effectively utilized as a cut-off device for isolating a desired portion of the pipe line which is to be repaired, re-arranged or extended.

Another object has been to provide an improved form of shut-off device for a pipe line.

A still further object has been to provide a combined severing and shut-off device for a pipe line having improved characteristics over single purpose devices.

These and many other objects will be apparent to those skilled in the art from the drawings, specification and appended claims.

Although the above illustrations are employed to bring out the principles of my invention, it will be apparent that other arrangements may be utilized without departing from the spirit and scope thereof.

Briefly summarized, I provide what may be termed a "basic" or "primary" arrangement or device having opposed sections or housing sleeves gripping the pipe to be severed along a line of severance thereof. A rotatable cutter or mill housing is mounted on the basic arrangement to cut the pipe. After a preliminary cut or hole has been drilled, the cutter is moved relatively to and about the pipe along the line of severance to completely cut off or sever the pipe into two spaced parts or sections. The cutting mill is adapted to be mounted on a rotatable housing and to be removed therefrom after the cutting operation has been effected. A plug or pin exit valve shuts off fluid flow from the live portion of the cut-off line or pipe section while the mill or cutter is being removed and also while a gate valve housing is being mounted thereon. The mill may be termed a "secondary" portion of my arrangement while the gate valve may be termed a "tertiary" portion thereof.

Figure 4:
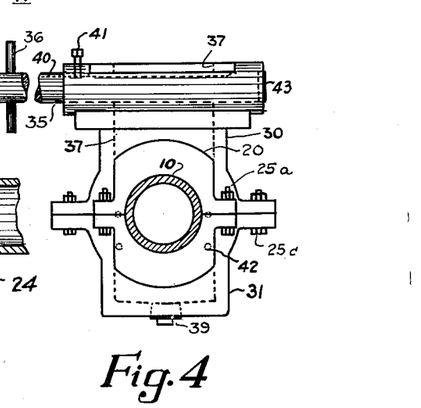
Figure 4 is a lateral or cross sectional view in elevation taken along the line IV—IV of Figures 2 and 3 and showing a fluid shut-off valve exit for the arrangement.
Figures 5, 6, 7:
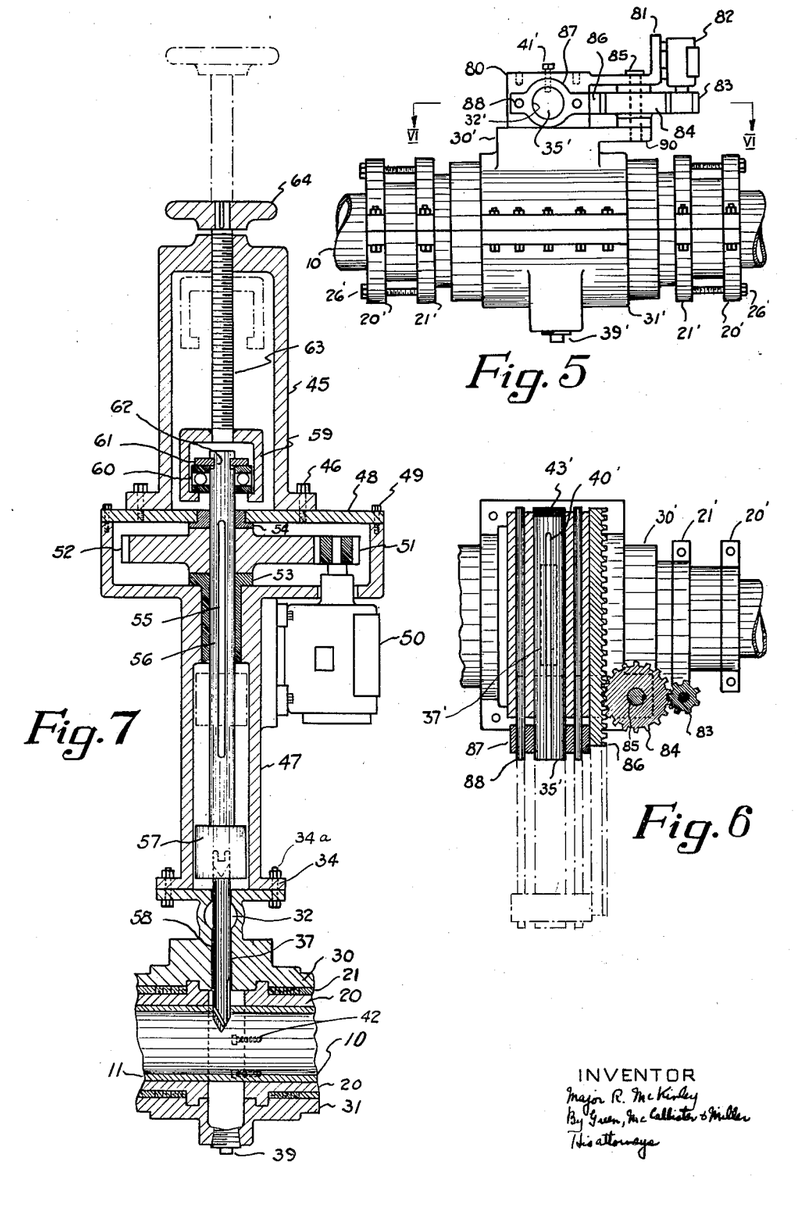
Figure 5 is a longitudinal side view in elevation showing a modified or power driven arrangement for actuating the shut-off valve, shown particularly in Figure 4.
Figure 6 is a top sectional view taken along the line VI—VI of Figure 5.
Figure 7 is a side view in vertical elevation and partial section of a cut-off device or mill adapted to be removably mounted on the appartus assembly shown in Figures 2 to 6, inclusive.
Figure 8:
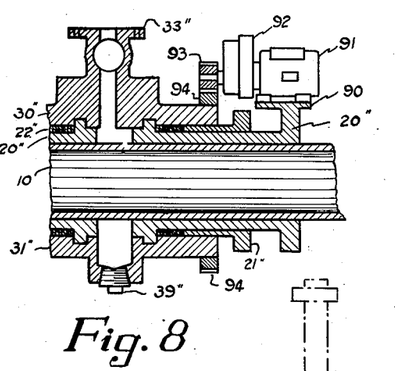
Figure 8 is a longitudinal partial side sectional view of a motor driven arrangement for rotating a housing of the apparatus shown in Figures 2 to 6, inclusive.

As shown in Figures 5 and 6, the plug or pin valve may be motor driven into and out of a closed position or, if desired, this may be effected manually, see Figure 4, or hydraulically by a pusher cylinder (not shown). A rotatable housing of the primary portion of my arrangement may be moved manually about the pipe during the cutting operation by gripping the mill housing shown in Figure 7 or may be moved mechanically by motive means as shown in Figure 8 of the drawings.

Figure 1:
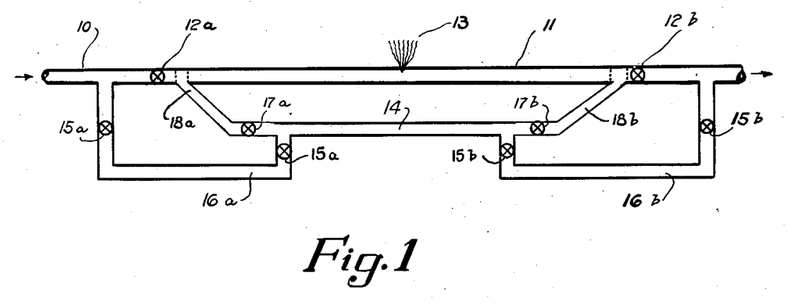
Figure 1 is a somewhat diagrammatic longitudinal view of a pipe line system or arrangement utilizing my invention. It also illustrates suitable procedire for utilizing the apparatus of the present invention.
Figure 9:
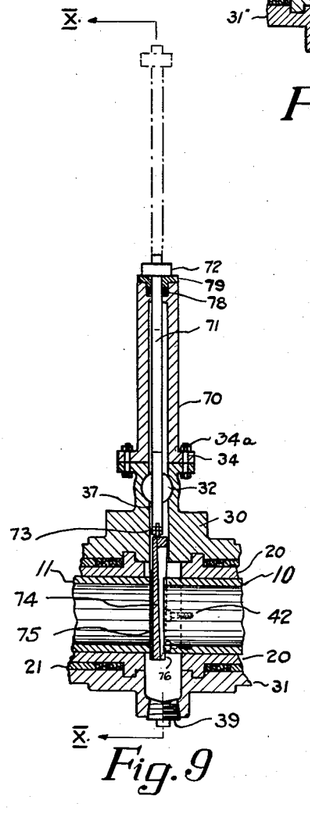
Figure 9 is a side view in elevation and partial section of a gate or shut-off valve arrangement adapted to be mounted on what may be termed the "primary" arrangement, shown for example, in Figures 2 to 6, inclusive, after the pipe has been cut into a pair of sections by a device, such as indicated in Figure 7.
Figure 10:
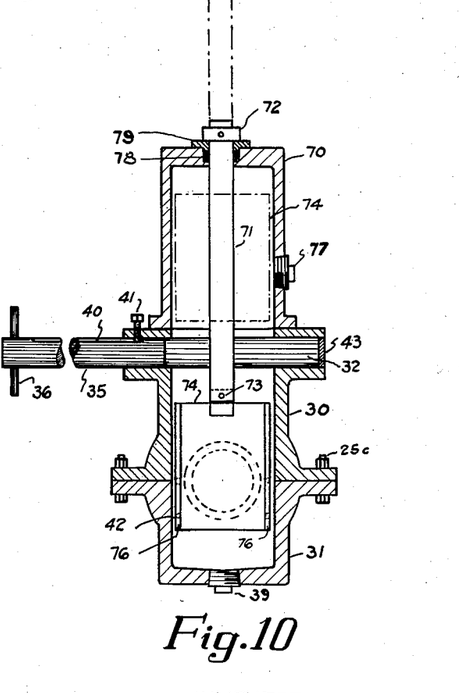
Figure 10 is a lateral or cross sectional view in elevation taken along the line X—X of Figure 9 and also showing the exit valve in an open position.

The tertiary portion of my arrangement is illustrated in Figures 9 and 10; this is utilized in such a manner that the primary portion of my device cooperates therewith to provide a valve for controlling or shutting off the live portion of the cut-off pipe section to a by-pass line, such as 18a or 18b of Figure 1 of the drawings.

Figure 2:
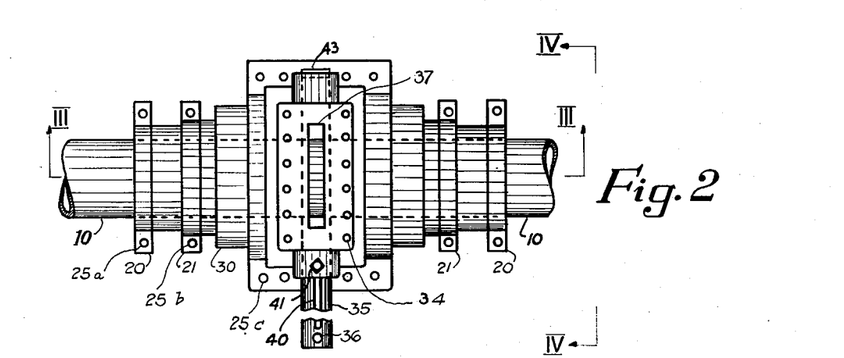
Figure 2 is a top plan view of an embodiment of my invention.

Referring particularly to Figure 1, 11 indicates a portion of a pipe line main 10 that is carrying a suitable fluid under pressure; the portion 11 may be a few feet or many miles in length. The portion 11 is to be severed or cut out and to effect this result, I contemplate mounting a device such as shown in Figure 2 of the drawings in the positions indicated as 12a and 12b of the figure. To prevent an interruption of service to customers, I also connect in a by-pass line, indicated as 16a, 14 and 16b, that can be employed to by-pass the section 11 and permit flow therearound. Suitable control or shut-off valves 15a and 15b may be connected in the by-pass lines as desired.

In accordance with my invention, cut-off and valve devices indicated at 12a and 12b isolate section 11 of the pipe line main 10. These devices are actuated to cut off the section 11, and, after a cut has been effected, to shut off fluid flow from the main portion of the line 10 to the cut off portion 11 while at the same time permitting fluid flow about the by-pass and around the cut-off portion. 13 indicates a hole drilled in the section 11 after it has been cut off to release any fluid remaining therein. After severance of the section 11, additional severances may be made close to valves 12a and 12b, the by-pass portions 16a and 16b eliminated, and line portions 18a and 18b substituted by connecting them to closed-end couplings, see the dotted lines of Figure 1, that are connected to short lengths of pipe 11 which then extend from the valves 12a and 12b. Thus, valves 12a and 12b may be opened and full flow effected from main 10 through valve 12a, lines 18a, 14 and 18b, and valve 12b. Valves 17a and 17b correspond to valves 15a and 15b of by-pass lines 16a and 16b.

Figure 3:
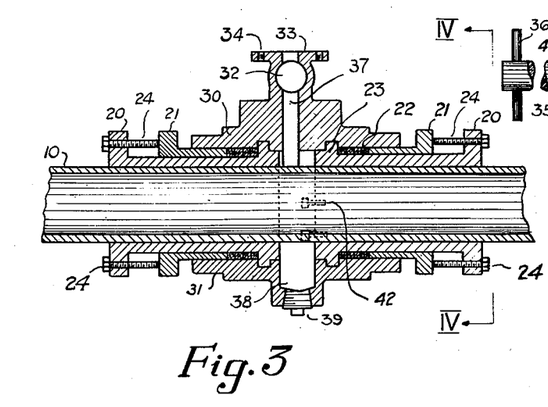
Figure 3 is a longitudinal side section in elevation taken along line III—III of Figure 2.

Referring particularly to Figures 2 to 4, inclusive, which disclose what may be termed a "basic" or "primary" device of the present invention, it will appear that it comprises two longitudinally spaced-apart and opposed pairs of sectional sleeve or housing members 20 and 21. The members of each pair are milled to interfit as shown. These sleeves are adapted to grip opposite portions of the pipe adjacent a line of severance thereof which is indicated by a slot or passageway 37. I contemplate securing the sleeves on the pipe 10 by welding or by employing clamping bolt means 25a and 25b, see Figures 2 and 4. The intermediate sleeve 21 may be eliminated and sleeve 20 shaped to fully operatively position a rotatable housing 30.

As implied above, housing sleeves 20 and 21 are preferably made in sections and tightly clamped or secured about the pipe section 10 in a fluid sealed-off relationship therewith. The inner sleeve 21 is provided with a slightly wedge-shaped taper with respect to the outer sleeve 20 and is adapted to force suitable packing material 22 inwardly against an upwardly projecting annulus or ring portion 23 of the sleeve 20, thus, sealing off the housing 30. Suitable threaded pressure bolts 24 may be employed for this purpose; that is, these bolts are adjustably threaded through an upwardly extending annulus collar or flange of the sleeve 20 to abut against a similar lug or collar of the sleeve 21.

The rotatable housing 30 is shown as having sections 30 and 31 that are held in an operably mounted position over the sleeves 20 and 21 by welding or by suitable clamping bolts 25c, see particularly Figures 3 and 4 of the drawings. The inner sleeves 20 and the rotatable housing 30—31 define an opening, spacing, or chamber 38 about the pipe 10 adjacent the line of severance thereof.

A lateral exit slot or passageway 37 extends upwardly from the opening 38 through the rotatable housing portion 30 to provide a fluid passageway and a guideway, first, for a cutting tool, and then, for a valve. Flow of pressure fluid through the passageway or slot 37 is controlled by a pin or plug auxiliary shut-off 35 that is adapted to move laterally with respect to the pipe section 10 within a seat portion 32. This valve may be of any suitable type such as a hinged valve. The end of the seat opening 32 is preferably closed off by a fluid sealed plug 43 in order to prevent the escape of pressure fluid therethrough when the plug valve 35 is in its open position. To prevent the valve 35 from being pulled completely out of its seat 32, a stop or guide detent 41 fits within a depression or groove 40 that extends along the valve 35 a sufficient distance to permit it to be moved to its fully open position. A hand grip rod 36 may be positioned to extend through the end of the auxiliary valve 35.

As shown in Figures 3 and 4, the lower half 31 of the rotatable housing is provided with a removable cleaning plug 39 through which cuttings produced by severing operations may be removed. It will be apparent that the passageway 37 is closed off when the plug valve 35 is moved to its extreme right-hand position in Figure 4 and it is open when the plug valve is moved to its extreme left-hand position. In order that the secondary and tertiary portions of the device may be mounted on the rotatable housing section 30, I provide a flange or mounting face 33 and suitable bolt openings 34.

To eliminate unnecessary description, I have used the same numerals in the embodiments of Figures 5 and 6 as applied to Figures 2 to 4, inclusive, but have added prime suffixes to indicate similar parts. By the same token I have added double prime suffixes in the embodiment of Figure 8 to indicate similar parts.

In Figures 5 and 6 I have shown a power driven exit slide valve 35' instead of a manually operated valve, such as shown in Figure 4. The valve may, if desired, be operated by a hydraulic or pneumatic cylinder connected thereto. The upper rotatable housing section 30' is slightly modified to permit mounting of a suitable cross head and motor driven arrangement. An extension mounting 80 of the rotatable housing section 30' is provided with the valve seat 32' through which the pin valve 35' is adapted to slide. The end of the pin valve 35' is secured to a cross-head 87 and also to guide rods 88 which are adapted to slide within the extension mounting 80. A gear rack 86 is secured to the cross-head 87 and meshes with a series of meshed speed reducing gear wheels 83 and 84. A shaft 85 extends upwardly from a ledge portion 90 of housing section 30' and is rotatably mounted or journaled between the ledge portion and a bracket portion 81 of the extension housing 80. A suitable motor 82, preferably a spark-proof electric or a fluid motor, is secured on the bracket extension 81 and actuates motor gear 83. It will be apparent that the motor 82 actuates the gear train 83 and 84 to move the rack 86 laterally of the device to move the auxiliary valve 35' to its open and shut positions with respect to the fluid passageway 37'.

The secondary or cutting mill part of my arrangement, shown in Figure 7, consists of an upper housing portion 45, a lower housing portion 47 and an intermediate housing plate 46 that are secured together by bolts 46 and 49. A motor 50, of any suitable type, such as mentioned in connection with Figure 5, is mounted on the lower housing portion 47 and is provided with a drive gear 51 meshing with and actuating a speed reducing ring gear 52. The ring gear 52 is journaled on suitable bearing portions 53 and 54 within housing portions 47 and 48 respectively. The ring gear 52 is feathered to a drill shaft 56 by means of a keyway 55 in such a manner that the drill shaft may slide vertically or longitudinally through the ring gear 52 for withdrawing and inserting or raising and lowering a drill or cutter 58 along an opening in housing 47 and along passageway 37 and the spacing or opening between opposed sleeves 20 into a suitable cutting position with respect to the line of severance of pipe 10. The keyway 55 is of sufficient length to permit the drill head 58 to clear the valve seat 32 when it is being mounted on and demounted from the rotatable housing 30, in order to not interfere with the operation of the shut-off or auxiliary valve 35.

The drill or cutter head 58 is adapted to operate in a fluid sealed off relationship within the slotted opening or passageway 37 of the upper housing section 30 and is removably secured to the cutter shaft 56 by any suitable form of conventional coupling, such as 57. This cutting mill may be termed an end mill.

Cutter shaft 56 is adjustably held in a suitable vertical position by inwardly-extending edges of an inwardly open adjustable support housing 59. A thrust bearing assembly 60 rests on the edges of the housing 59 and is held in position by a U-shaped removable key 61 which is wedged into slots 62 at the end of the cutter shaft 56.

Vertically adjustable cutter support housing 59 rotatably receives an adjusting screw 63 that is threaded within the upper end of housing 45 and has a suitable hand wheel or grip 64 keyed thereto. A rotation of the hand wheel 64 will cause the adjusting screw 63 to change its position within housing 45 and rotate within the adjusting housing 59 to move the cutter assembly from the position shown in dot and dash lines of Figure 7 to the cutting position shown in full lines of of the same figure. It will be apparent that the hand wheel will be tightened down to drill a preliminary hole or cut in the pipe line 10. Then, the rotatable housing 30—31 with its mill assembly is moved about the pipe 10 until 360° have been traversed to effect complete severance of the pipe into two spaced apart sections.

In Figure 8 I have shown a power driven arrangement for effecting the rotation of the rotatable housing 30"—31". In this arrangement stationary sleeve 20" is provided with a mounting extension to receive a motor 91 of a type such as indicated in the description of Figure 5. The motor drives a gear train 92 which drives a gear 93 meshing with a ring gear 94 securely welded or mounted on and about the rotatable housing sections 30"—31". Such rotatable housing sections are provided with an extension beyond the clamping portions for the bolts 25c, see Figures 1 and 4.

After severance of the pipe line 10 has been accomplished in the manner described above, I prefer to turn the hand grip 64 to its upper dot-dash line position in Figure 7 and shut off the fluid flow through passageway 37 by moving valve 35 to its closed position. The clamping bolts 34a of Figure 7 are then removed and the mill housing 47 is dismounted from the rotatable housing section 30. While the auxiliary valve 35 is still closed, I prefer to mount a pipe line shut off or master valve or tertiary arrangement, see Figures 9 and 10, on the rotatable housing portion 30 in a fluid-sealed-off relationship therewith by again using the clamping bolts 34a.

The primary device can, if desired, be removed from the pipe 10 and the live portions thereof sealed off, if the by-pass arrangement 18a and 18b is to be used. However, I prefer to employ the primary device as a master valve across the dead section 11 of the cut-off pipe 10 and to, at least initially, by-pass fluid from the live section 10 through the by-pass arrangement 16a and 16b. To effect the latter result, I prefer to mount a tertiary or master valve housing 70 on the housing section 30 while the exit or auxiliary valve 35 is still closed. When the housing 70 is being mounted, valve shaft 71 is in its upper or dot and dash line portion shown in Figures 9 and 10, in order that valve plate 74 will clear the exit or auxiliary valve 36. After the housing 70 has been securely mounted, I then move the valve 35 to an open position. The housing 70 has an opening adapted to align with passageway 37 of the rotatable housing section 30.

The master valve consists of a vertically movable operating shaft 71, having at its upper end a collar 72 secured thereto and, at its lower end, a connecting piece 73, preferably flexible, removably bolted thereto to support the valve plate 74. Packing 78 and sleeve 79 prevent the escape of fluid between the housing 70 and shaft 71. The piece 73 is securely attached as, for example, by welding to the upper portion of the valve plate 74. Valve plate 74 is provided on its back face with a flange 76 extending outwardly along the opposite vertical sides thereof to define a central fluid passageway open to top edge portions thereof; if desired, this face may be cone or cup shaped to facilitate fluid flow therealong.

As seen in Figure 9, the flanges 76 are slightly tapered downwardly to abut against wedge or guide bolts 42 that are removably mounted to extend from the right-hand stationary sleeve portions 20. It will be apparent that, when the valve plate 74 is moved downwardly, its planer front face having the gasket material 75 thereon, will seal off the left-hand section of pipe 11 (see Figure 9), and will be held in increasingly tight engagement by abutment of flanges 76 against bolts 42; any suitable wedging or cam arrangement may be employed in this connection. It will also be apparent that fluid will be free to flow from the right-hand pipe line section 10, shown in Figure 9, upwardly between the flanges 76 through the passageway 37 into housing portion 70. The housing 70 is provided with a bull or other suitable type of plug 77 (see Figure 10) which can be removed and a nipple threaded therein to connect by-pass lines 16a and 16b of Figure 1. Referring to the description in column 3, lines 22 to 44, inclusive, after the second by-pass lines 18a and 18b have been connected, the master valve 74 or 74' may be opened, the first used by-pass lines 16a and 16b and their associated valves 15a and 15b may be removed, and the plug 77 replaced. The by-pass pipe lines are shortened and expensive gate valves eliminated by utilizing the arrangement shown in Figure 1.

In Figure 9, the right-hand section 10 of the pipe line is the live or main section and the left-hand portion 11 is the cut-off or (at least temporary) dead section; if the master valve is to be used as above described. However, it will be apparent that many other uses and applications of the pipe shut-off valve may be made without departing from the scope of the invention. It will also be apparent that master valve 74 may be raised, exit valve 35 closed, and the housing 70 and its associated valve mechanism may be removed at any time to permit direct flow between the severed pipe line section, for example, when the second by-pass lines 18a and 18b are used. Of course, the exit or auxiliary valve 35 will be closed before the housing 70 is removed and will be kept closed if the device is to be employed to reconnect the severed pipes line sections 10 and 11. The first by-pass lines 16a and 16b, or an additional line may, if desired, be connected to the opening or passageway in the rotatable housing section 31 by removing cleaning plug 39 and inserting a nipple.

The guide or wedge bolts 42 are mounted in the sleeve portions 20, see Figures 9 and 10, so as to clear the cutter head 58 during the cutting off operation.

Figures 11, 12, 13:
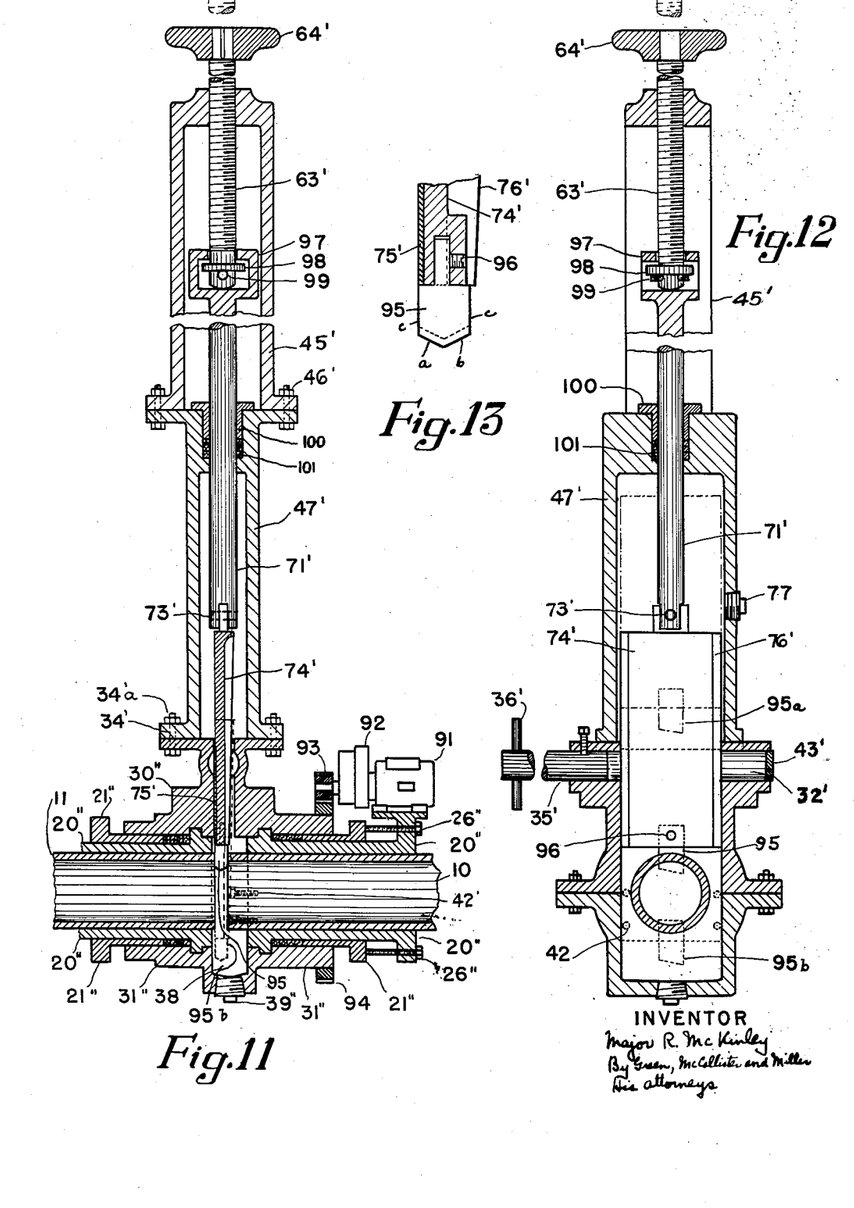
Figure 11 is a side view similar to Figure 7 showing a modified arrangement wherein the master valve and the cutter are combined.
Figure 12 is a vertical end sectional view in elevation taken at right angles to Figures 11.
Figure 13 is a fragmental side view in elevation of a detail of Figure 11.

In Figures 11, 12 and 13 of the drawings, I have shown a modified arrangement wherein the master valve and the cutting mechanism are combined in such a manner that it is not necessary to detach the cutting mechanism and to mount the master valve mechanism. In this embodiment I may actuate the cutting mechanism manually, but prefer to actuate it by motive means such as disclosed in Figure 8 of the drawings. To simplify the description, I have used the same numbering for the same parts as used in the embodiment of Figure 8, and have used single prime suffixes to indicate parts that are similar to the embodiments of my invention as shown for example in Figures 7 and 9.

In the above mentioned modification I have provided an upper housing 45' removably connected by bolts 46' to a lower fluid-sealed-off housing 47'. A valve and cutter support shaft 71' is at its upper end provided with an extension 97 within which adjustable screw 63' is rotatably mounted by washer 98 and pin 99. As shown in Figure 12 the upper housing 45' in this embodiment may consist of spaced apart members in that the sleeve 100 and gasket material 101 seal off fluid within the lower housing portion 47'. The master valve plate 74' is provided with gasket material 75' on one face to close off the cut-off portion of the pipe line 11 and on its other face is provided with a pair of tapered flanges 76' which engage cams or bolts 42', similar to the arrangement shown in Figure 9. Fluid is adapted to flow from the cut off main line 10 up into the housing 47' and through the connection 77 to the by-pass lines 16a and 16b after the master valve has been closed.

In this arrangement the valve plate 74' is slotted out at its lower edge to receive a cutter or cutter key 95 which may be removably secured therein by set screw 96, see Figure 13. The cutter has suitable cutting faces or edges such as a, b, and c. In employing this arrangement, I contemplate taking a preliminary cut utilizing the faces a and b and then taking progressively deeper and wider cuts utilizing faces a, b, and c by advancing the screw 63', or in other words, by turning the handle wheel 64' downwardly. If desired, a plurality of cutters may be mounted on plate 74' that have different shapes corresponding to desired cutting functions. It will be apparent that the edges of the cutter key 95 will aid in advancing the cut about the pipe section as the outer or rotatable housing member sleeve 30'' is caused to move circumferentially thereabout. After the desired width of cut has been effected, the screw 63' is employed to move the plate 74' downwardly to the position shown by the dotted lines in Figures 11 and 12, so that its face 75' closes off the cut-off line 11. In Figure 12, 95a indicates the position of the cutter while the secondary mechanism is being mounted on the primary mechanism 30'', 95 indicates its cutting position and 95b indicates its position when the valve plate has closed off the cut-off section 11 of the pipe line. It will be apparent to those skilled in the art that any suitable type or number of cutter or cutters such as 95 may be employed in this connection.

One of the important features of the present invention lies in the facility of replacement of pipe lines while they are carrying fluids such as gas or liquid under high pressure without in any sense interrupting the delivery of the fluid to domestic or industrial consumers. Unlike electricity, gas cannot be shut off without danger of fire, explosion, etc. The primary portion of my device consisting of the housing members 20 and 30 prevent the severed pipe sections from axially pushing or telescoping together or from pulling apart. In other words, the members 20 and 30 keep the pipe line sections 10 and 11 in perfect alignment after they have been severed.

It will be apparent that my invention may be utilized as a valve mechanism or as a cut-off mechanism, alone, or in combination and also that it may be used as a severed line connecting device. The housing may be simplified if the device is to be utilized only as a master valve, for example, the portions 20 and 21 may be eliminated and the rotatable portions 30 and 31 may be securely welded or clamped to the pipe severed sections. It will also be apparent that other forms of valves may be utilized for shutting off fluid flow and that these and many other adaptations, modifications, substitutions, subtractions or combinations thereof may be made within the scope of my invention as indicated in the appended claims.

It will be appreciated that the principles of my invention may be utilized in a number of ways. For example, a fitting or device of my invention may be used with a standard Dresser coupling. In this application, a Dresser coupling of the desired size will be provided and one flange, including its gasket, will be positioned over the pipe line 10 adjacent to a proposed line of severance thereof. This flange may then be secured in a fluid-sealed-off relationship on the pipe 10 by welding it thereon and the sleeve and second flange of the Dresser coupling, including its gasket, will be slidably positioned over the pipe 10 in a spaced apart relationship with respect to the first flange, corresponding to the line of severance. Split portions of the last-mentioned parts of the Dresser coupling will be welded together along a longitudinal axis.

Removable pull-up clamps may be provided to engage ends of the secured and slidably positioned flanges of the Dresser coupling and to extend across the sleeve portion thereof. Such removable pull-up clamps will have a pair of longitudinally extending anchor bolts that may be mechanically or hydraulically operated.

The primary housing 30 and its associated parts such as shown in Figure 3 may then be mounted over the Dresser coupling assembly. However, in this connection, the chamber 38 is enlarged longitudinally and the other parts are extended sufficiently to permit the Dresser coupling assembly to be received within such spacing. The pair of anchor bolts are positioned to extend in a fluid sealed off relationship through openings in one end of the housing 30. The primary fitting including housing 30 is mounted in a fluid-sealed-off relationship about the pipe 10, in the manner previously described. A secondary or cutter fitting such as shown in Figures 7 or 11, is then mounted on the housing 30 and the pipe severed. The master valve such as 74 of the tertiary fitting of Figure 9 or 74' of the secondary fitting of Figure 11 is then positioned to close off one of the severed pipe sections. After the lines 18a and 14 and 18b have been connected in a manner such as previously described, and temporary by-pass lines 16a and 16b disconnected, the anchor bolts are pulled up tightly to move the slidable Dresser sleeve and flange into close fluid-sealed-off abutment with the secured flange. A longitudinally half of the fitting of Figure 3 is removed and the standard coupling bolts of the Dresser coupling are tightened and secured; the anchor bolts are then loosened to permit the other half of the fitting of Figure 3 to be removed. The anchor bolt and clamp combination may be then removed. When such operations have been completed at locations such as 12a and 12b of Figure 2, fluid is free to move from the main line 10 through a Dresser coupling, which take the place of valve fitting 12a of Figure 1, through lines 18a, 14 and 18b and a Dressing coupling which takes the place of valve fitting 12b. Thus, it will be apparent that the fittings of my invention may be moved to another location and used.

What I claim is as follows:

1. In a fitting adapted to be mounted on a pipe length, a pair of sleeve members adapted to be mounted on the pipe in an opposed and spaced apart relationship with respect to each other along a line of severance of the pipe, a housing member rotatably positioned on said sleeve members and defining a chamber with the spacing therebetween, said housing member having a fluid passageway extending therethrough and connected to said chamber, a cutter housing adapted to be mounted on said rotatable housing over said passageway and defining a chamber with said passageway, and cutter means operatively positioned in said cutter housing to extend along said second-mentioned chamber and along said passageway through said first-mentioned chamber to engage the pipe between said pair of sleeve members at the line of severance of the pipe.

2. In a fitting adapted to be mounted on a pipe length about a proposed line of severance of the pipe, a pair of sleeve members adapted to be secured on the pipe in an opposed relationship thereon along a line of severance of the pipe, said pair defining an opening to the line of severance of the pipe, a rotatable member operatively positioned on said sleeve members and over the opening thereof, a passageway in said rotatable member extending therethrough to the opening of said sleeve members, a cutter housing adapted to be secured on said rotatable housing in substantial alignment with said passageway for rotation with said rotatable member, cutter means operatively mounted in said housing, means for adjusting said cutter means along said passageway and the opening of said sleeve members to engage the pipe on the line of severance thereof, and means for rotating said housing and cutter means at its pipe-engaging position to sever the pipe.

3. In a closure fitting of the character described adapted to be mounted over an opening in a pipe length in a fluid sealing-off relationship with the pipe, a rotatable housing member adapted to be mounted on the pipe and about the opening therein, a fluid passageway extending through said housing member and opening to the spacing between the severed portions of the pipe, a valve housing mounted on said housing member over said fluid passageway and having an opening connected thereto, said valve housing being rotatable with said housing member, so that it may be accommodated to spacing limitations about the pipe length, and a valve operatively positioned to move along said opening and along said passageway and into closing off engagement with the opening in the pipe.

4. In a fitting adapted to be mounted on a pipe length, a primary housing having spaced apart portions adapted to be mounted over the pipe adjacent a portion thereof that is to be severed, a secondary housing rotatably mounted over and about said primary housing and enclosing the spacing between the spaced-apart portions thereof, said primary housing being secured on the portion of the pipe that is to be severed, means adapted to be operatively positioned on said secondary housing and to rotate therewith for cutting off a portion of the pipe, and means adapted to be operatively positioned on said secondary housing and to extend between the spaced-apart portions of said primary housing for closing off fluid flow between cut out portions of the pipe line.

5. In a fitting adapted to be positioned on a pipe length carrying fluid under suitable pressure, a housing member adapted to be secured on the pipe in a fluid sealed-off relationship with respect to the surrounding atmosphere, fluid sealed-off cutting means adapted to be positioned on and to extend within said housing member and into engagement with the pipe, and means for actuating said cutting means to sever a portion of the pipe without releasing the fluid to the atmosphere, said cutting means having valve means operably positioned within said housing for closing off fluid flow through at least one of the severed pipe portions.

6. In a closure fitting of the character described adapted to be positioned about a line of severance of a fluid-carrying pipe length, a pair of sleeve members adapted to be securely mounted in an opposed and endwise spaced-apart relationship on the pipe length to define an annular spacing about the line of severance of the pipe, a housing member rotatably mounted over and extending about said sleeve members, said housing member defining a fluid chamber with the annular spacing defined by said sleeve members, said housing member having a mounting portion extending laterally therefrom, a laterally-extending guideway through said mounting portion and open at one end to said fluid chamber, a mounting flange on said mounting portion and about said guideway to receive auxiliary cutter and valve mechanism thereon, said guideway defining a fluid passageway through said mounting portion and a slideway for the cutter valve mechanism, a valve seat extending through said mounting portion and across said guideway, and a slide valve operably positioned on said valve seat to close off fluid flow through said guideway from the line of severance of the pipe length when cutter and valve mechanism is to be mounted on and removed from said mounting flange.

7. In a closure fitting of the character described adapted to be mounted on a pipe length in a fluid sealed-off relationship therewith, a pair of sleeve members adapted to be securely mounted on the pipe and defining an annular opening endwise therebetween about a line of severance of the pipe length, a housing member rotatably mounted on said sleeve members and defining with said sleeve members an annular chamber about the line of severance of the pipe length, a guideway slot extending through said housing member from the annular chamber to a mounting portion thereof, a cutter unit operably secured on the mounting portion of said housing member and having a cutting blade portion adapted to slide along said guideway slot into engagement with the pipe length at the line of severance thereof, means for rotating said housing member and actuating said cutting blade portion to sever the pipe length into sections, said sleeve and housing members having portions shaped to hold severed pipe sections in substantially the same relative relationship as before severance of the pipe length.

8. In a closure fitting of the character described adapted to be mounted on a pipe length in a fluid sealed-off relationship therewith about a line of severance thereof, a pair of sleeve portions adapted to be secured on the pipe length in an opposed and spaced-apart relationship thereon about the line of severance of the pipe length, a housing member operably positioned on said sleeve portions and about the spacing therebetween, a narrow passageway and guide slot open laterally through said housing member to the spacing between said sleeve portions, a valve operably positioned in said housing member for movement across said slot to periodically close off said slot when its outer end is open to the atmosphere, a mill housing adapted to be secured on said housing member over the slot therein, cutter means operably mounted in said mill housing for movement from a raised position above said shut-off valve to a lowered and guided position along said slot into engagement with the pipe length at the line of severance thereof, and means for actuating said cutter means at pipe engaging position and for rotating said housing member during the actuation of said cutter means to sever the pipe length into a pair of sections.

9. In a closure fitting of the character described adapted to be secured on spaced-apart portions of a pipe length at a line of severance thereof in a fluid sealed-off relationship therewith, a housing member adapted to be mounted on the pipe length and across a line of severance thereof, a slotted passageway extending laterally through said housing member and open to the spacing between severed portions of the pipe length, a valve housing mounted on said housing member over said slotted passageway and open thereto, a master valve operably positioned to slide through the opening in said valve housing and to be guided along said slotted passageway between the severed portions of the pipe length into a closing-off engagement with one of the severed portions of the pipe length, said master valve having a planar plate member provided with outwardly-projecting side flange portions to define a central fluid passageway open to top and bottom portions thereof, said plate member being adapted to abut the one severed portion of the pipe length to close it off, said side flange portions being adapted to abut the other severed portion of the pipe length to position said plate member and to direct fluid flow along between said side flange portions upwardly through said slotted passageway into said valve housing, and said valve housing defining an opening therein connected to a by-pass pipe length to direct fluid flow between the other severed portion of the pipe length and the by-pass pipe length.

10. In a closure fitting of the character described adapted to be mounted about a line of severance of a fluid-carrying pipe length, a pair of housing members adapted to be mounted in a spaced-apart relationship with respect to each other at the line of severance of the pipe length, a separate housing member rotatably positioned and secured in a fluid sealed-off relationship on said pair of housing members and over the spacing therebetween to define a fluid chamber about the line of severance of the pipe length, said separate housing member having a mounting portion extending laterally thereof and provided with a mounting flange, a relatively narrow guide and passageway-defining slot extending laterally through said mounting portion and open to said mounting flange and to the fluid chamber, an auxiliary valve slidably positioned in said mounting portion for movement across said slot to close off and prevent fluid flow from said separate housing member, said mounting flange being adapted to receive and securely position a cutting apparatus over said slot and to receive and securely position a master valve apparatus over said slot, said slot being of substantially rectangular form and defining a guideway for cutting means carried by said cutting apparatus and for a master valve carried by said master valve apparatus to slidably guide them laterally in alignment with the line of severance of the pipe length and into an operative positioning with respect to the pipe length.

11. A closure fitting as defined in claim 7 wherein, said cutter unit has a closure plate portion to engage and close off an end of a severed pipe section, and said cutting blade portion is carried by said closure plate portion.

12. In a closure fitting of the character described adapted to be positioned about a line of severance of a fluid-carrying pipe length, a pair of housing sections adapted to be mounted about the pipe length in an endwise spaced-apart relationship with respect to each other annularly along the line of severance, means for securing said housing section in a fluid-sealed-off relationship on the pipe length, a unitary housing member mounted about said pair of housing sections and over the spacing defined therebetween and defining an annular chamber therewith, said housing member and said pair of housing sections having means holding them in an assembled relationship with respect to each other before and after the pipe length has been severed along its line of severance, a laterally-extending mounting portion on said housing member having walls defining a relatively narrow guideway slot therethrough open to the annular chamber and providing a fluid passageway through said housing member, said walls also defining a valve seat transversely of said guideway slot, a flange about an outer end of said guideway slot and extending from said mounting portion to secure a pipe cutting and valve mechanism thereon, a slide valve operably positioned in said valve seat, and means for moving said slide valve along said valve seat to close off said guideway slot and prevent leakage of fluid from a severed pipe length when the cutter and valve mechanism is being mounted on and removed from said flange, said guideway slot being in alignment with the line of severance of the pipe length and of a dimension to slidably introduce the cutting and valve mechanism into the chamber when the mechanism has been mounted on said flange and said slide valve has been moved to an open position; said means for holding said housing member and said pair of housing sections in an assembled relationship with respect to each other comprising an annular flange projecting from each of said housing sections and slidably positioned within grooved portions of said housing member, and said housing member being rotatably positioned on said pair of housing sections to move the pipe cutting mechanism about the line of severance of the pipe length.

13. In a method of cutting off a section of a fluid-carrying pipe line and of by-passing fluid flow from one cut-off section with respect to the other cut-off section, the steps of providing a fluid sealed-off enclosure about the pipe and a line of severance thereof, fully severing off the pipe across a single transverse plane width therethrough and from the fluid-sealed-off enclosure without permitting the escape of fluid from the enclosure, and sealing of one severed section of the pipe while permitting fluid flow between the other severed section and a by-pass pipe line, all without permitting fluid to escape from the enclosure except through the by-pass.

MAJOR R. McKINLEY.

REFERENCES CITED

The following references are of record in the file of this patent:

UNITED STATES PATENTS

| Number | Name | Date |
|---|---|---|
| 541,990 | Christie | July 2, 1895 |
| 582,230 | Richardson | May 11, 1897 |
| 587,107 | Sherrerd | July 27, 1897 |
| 732,400 | Dresser | June 30, 1903 |
| 745,774 | Brady | Dec. 1, 1903 |
| 784,445 | Sylvester | Mar. 7, 1905 |
| 940,356 | Phelps | Nov. 16, 1909 |
| 982,505 | Koenig | Jan. 24, 1911 |
| 1,074,259 | Gordon | Sept. 30, 1913 |
| 1,701,786 | McMurray | Feb. 12, 1929 |
| 1,756,830 | Marshall | Apr. 29, 1930 |
| 1,898,935 | Brandriff | Feb. 21, 1933 |
| 1,996,252 | Miller | Apr. 2, 1935 |
| 2,171,943 | Mueller | Sept. 5, 1939 |

FOREIGN PATENTS

| Number | Country | Date |
|---|---|---|
| 106,849 | Switzerland | of 1924 |